Oct. 16, 1923.
S. W. NICHOLSON
SEAT CONSTRUCTION
Filed Aug. 8, 1917
1,471,001
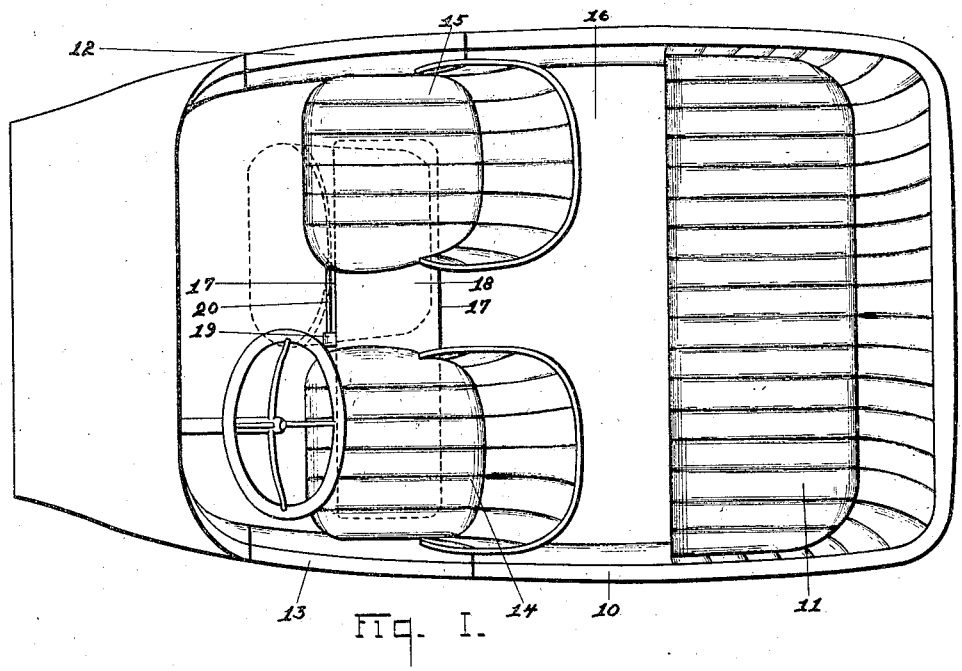
Fig. I.
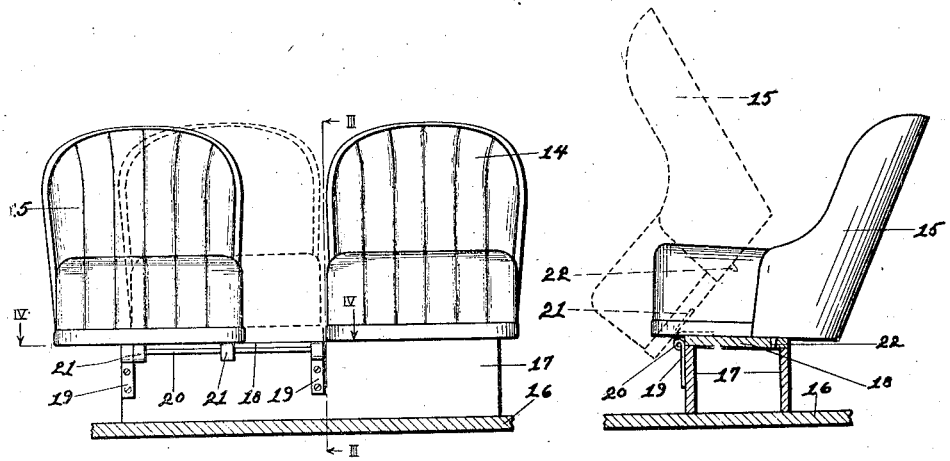
Fig. I.    Fig. II.
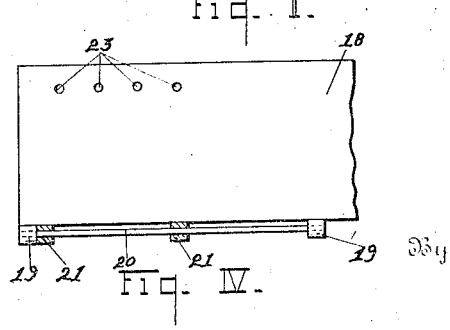
Fig. IV.
Inventor
Samuel W. Nicholson
By Chester H. Braselton
Attorney Patented Oct. 16, 1923.

1,471,001

UNITED STATES PATENT OFFICE.

SAMUEL W. NICHOLSON, OF TOLEDO, OHIO, ASSIGNOR TO THE WILLYS-OVERLAND COMPANY, OF TOLEDO, OHIO, A CORPORATION OF OHIO.

SEAT CONSTRUCTION.

Application filed August 8, 1917. Serial No. 185,064.

*To all whom it may concern:*

Be it known that I, SAMUEL W. NICHOLSON, a citizen of the United States, residing at Toledo, in the county of Lucas and State of Ohio, have invented certain new and useful Improvements in Seat Construction, of which I declare the following to be a full, clear, and exact description.

This invention relates to an improved seat construction for motor vehicles.

The principal object of this invention is to provide an improved seat arrangement of such a nature that the front seat, next to the driver's seat, may be moved to one side to provide a passage from the door to the rear seat.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming part of this specification, in which Figure I is a top plan view of a vehicle body embodying my invention.

Figure II is a fragmentary, detail view, in elevation of the front seat.

Figure III is a detail, sectional view, taken on the line III—III of Figure II, the seat being shown in its tilted position by dotted lines, and Figure IV is a detail, sectional view, taken substantially on the line IV—IV of Figure II.

In the drawing, similar reference numerals refer to similar parts throughout the several views, and the sectional views are taken looking in the direction of the little arrows at the ends of the section lines.

Considering the numbered parts of the drawing, I have shown a vehicle body 10 provided with a rear seat 11 and the doors 12 and 13 at the front of the body. The door 13 is next to the driver's seat 14 while the door 12 is next to the adjustable front seat 15.

The body 10 is provided with the floor 16 on which a support for the front seat, having the side walls 17 and the top wall 18, is mounted. Brackets 19 are secured to the front wall 17 of the seat support and these brackets carry a rod 20. Brackets 21 are secured to the bottom of the front seat 15 near the forward edge thereof and these brackets are slidably mounted upon the rod 20. The dowel pin 22 is carried by the bottom of the front seat 15, towards the rear thereof and said dowel pin is adapted to be engaged in any one of the holes 23 formed in the top 18, of the support, so that the front seat may, if desired, be adjusted to any one of several positions with reference to the driver's seat.

In Figure II, the normal position of the front seat 15 is indicated in full lines and, in dotted lines, there is shown the position to which the seat is moved when parties desire to gain access to the rear seat through the door 12. The front seat is first tilted forwardly as shown in dotted lines in Figure III of the drawing, is then moved laterally to the position indicated by the dotted lines in Figure I and finally dropped to the position indicated by dotted lines in Figure II, so that a passage is provided from the door 12 to the rear seat between the front seat 15 and the adjacent side of the body 10. It will be seen that the front seat 15 cannot move laterally when it is in its normal operative condition because of the engagement of the dowel pin 22 in the hole 23, but the front seat can be tilted forwardly at all times, rocking on its pivot rod 20, and, when so tilted forwardly, can be moved laterally towards the driver's seat so as to give a passage way by means of which access can be gained to the rear seat.

I am aware that the particular embodiment of my invention, which I have here shown and described, is susceptible of considerable variation without departing from the spirit of my invention. I have found, however, that this particular embodiment is desirable from many standpoints and, therefore, I desire to claim the same specifically, as well as broadly, as indicated by the appended claims.

Having thus described my invention, what I claim as new and desire to secure Letters Patent is:

1. In a vehicle body, in combination, a driver's seat, a sliding front seat in line with the driver's seat and normally spaced therefrom, said sliding seat being slidable towards and from the driver's seat to provide a passage for passengers to the rear of the vehicle between said slidable seat and the side wall of the vehicle body.

2. In a vehicle body, a driver's seat, and a front seat normally spaced from the driver's seat and slidable in line with and towards and from the driver's seat within the body to provide a passage for passengers to the rear of the body between said slidable seat and the side wall of the body.

3. In a vehicle body, a rear seat, a front seat support extending thansversely of the vehicle body from one side of the vehicle body and terminating short of the opposite side of the vehicle body to provide a passageway to the rear seat, a tiltable front seat mounted upon the front seat support and slidable thereon laterally of the vehicle body from its outer position when tilted only to provide entrance to the rear seat through the passageway.

4. In a vehicle body, a rear seat, a front seat support extending transversely of the vehicle body from one side of the vehicle body and terminating short of the opposite side of the vehicle body to provide a passageway to the rear seat, a driver's seat mounted on said support at the first named side of the vehicle body, a front seat mounted upon the front seat support and normally spaced from the driver's seat and extending across said passage, said front seat being slidable towards and from the driver's seat to provide entrance to the rear seat through the passageway.

5. In a vehicle body, a rear seat, a front seat support extending transversely of the vehicle body to a point adjacent one of the side walls of the body, a driver's seat permanently secured to the seat support, and a tilting and sliding seat carried by the seat support and slidable when tilted only towards and from the driver's seat to provide a passage to the rear of the vehicle between said movable seat and one side wall of the vehicle body.

6. In a vehicle body, a rear seat, a front seat support extending transversely of the vehicle body and from one side of the vehicle body and terminating short of the opposite side of the body to provide a passage way to the rear seat, a driver's seat fixedly secured to the seat support, and a second seat carried by said support normally extending across said passage and slidable on the support toward and from the driver's seat.

In testimony whereof I affix my signature,

SAMUEL W. NICHOLSON.

Certificate of Correction.

It is hereby certified that in Letters Patent No. 1,471,001, granted October 16, 1923, upon the application of Samuel W. Nicholson, of Toledo, Ohio, for an improvement in "Seat Construction," an error appears in the printed specification requiring correction as follows: Page 2, claim 2, line 7, strike out the words " in line with and " and insert the same to follow the word " seat " in line 6; and that the said Letters Patent should be read with this correction therein that the same may conform to the record of the case in the Patent Office.

Signed and sealed this 18th day of March, A. D., 1924.

[SEAL.]

KARL FENNING,
*Acting Commissioner of Patents.*